US004001622B2

United States Statutory Invention Registration [19]

[11] Reg. Number: H1622

[45] Published: Dec. 3, 1996

Himes

[54] HYDROGENATED DIBLOCK COPOLYMERS FOR ADHESIVES AND SEALANTS WITH IMPROVED RESISTANCE TO DEGRADATION

[75] Inventor: Glenn R. Himes, Houston, Tex.

[73] Assignee: Shell Oil Company, Houston, Tex.

[21] Appl. No.: 453,147

[22] Filed: May 30, 1995

[51] Int. Cl.[6] ..... C08L 53/00

[52] U.S. Cl. ..... 525/89; 525/98; 525/314

[58] Field of Search ..... 525/89, 98, 314

[56] References Cited

U.S. PATENT DOCUMENTS

| | | | |
|---|---|---|---|
| 4,163,764 | 8/1979 | Nash . | |
| 4,346,193 | 8/1982 | Warfel . | |
| 4,391,949 | 7/1983 | St. Clair . | |
| 4,849,481 | 7/1989 | Rhodes et al. . | |
| 5,001,199 | 3/1991 | Hoxmeier . | |
| 5,149,895 | 9/1992 | Coolbaugh et al. . | |
| 5,405,903 | 4/1995 | Van Westernen | 525/89 |
| 5,420,203 | 5/1995 | Dillman | 525/98 |
| 5,453,319 | 9/1995 | Gobran | 525/98 X |

FOREIGN PATENT DOCUMENTS

| | | |
|---|---|---|
| 0471999A2 | 7/1991 | European Pat. Off. . |
| 0516203A2 | 4/1992 | European Pat. Off. . |
| 0524765A1 | 7/1992 | European Pat. Off. . |

*Primary Examiner*—Charles T. Jordan
*Assistant Examiner*—John R. Hardee

[57] ABSTRACT

Adhesive and sealant compositions having improved resistance to a degradation which comprises: (a) a hydrogenated triblock, multiblock, radial, or star block copolymer of a vinyl aromatic hydrocarbon and a conjugated diene, (b) from 3 to 50 percent by weight of the total composition of a hydrogenated diblock copolymer of a vinyl aromatic hydrocarbon and a conjugated diene wherein the overall molecular weight of the diblock ranges from 8000 to 100, 000, the molecular weight of the poly vinyl aromatic hydrocarbon block ranges from 4000 to 32,000, the molecular weight of the poly conjugated diene block ranges from 3000 to 90,000, and the vinyl aromatic hydrocarbon content ranges from 30 to 70 percent by weight of the diblock copolymer, and (c) 20 to 400 parts by weight per 100 parts by weight of total block copolymers of a tackifying resin.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDROGENATED DIBLOCK COPOLYMERS FOR ADHESIVES AND SEALANTS WITH IMPROVED RESISTANCE TO DEGRADATION

BACKGROUND OF THE INVENTION

This invention is directed to adhesive and sealant compositions which contain hydrogenated diblock copolymers. More particularly, the invention is related to such compositions containing triblock or radial or star hydrogenated block copolymers as well as the hydrogenated diblocks.

Block copolymers have been employed in adhesive compositions for many years, primarily because of their high cohesive strengths and their ability to crosslink without a chemical vulcanization step. Block copolymers such as those described in U.S. Pat. No. 3,239,478 are either linear or radial or star styrene-butadiene or styrene-isoprene block copolymers. The high cohesive strength of these polymers is often a detrimental quality in certain applications. In the past, cohesive strength was reduced by adding an unhydrogenated styrene-isoprene diblock copolymer to the primary block copolymer to lower the cohesive strength and give less elasticity and better conformability. The diblocks had to be unhydrogenated in order to provide sufficient tackiness.

These conventional block copolymers when used in adhesives tend to degrade in processing and/or over time because they are unsaturated in the main rubber chain. These unsaturation sites are reactive sites which are vulnerable to attack, such as by free radicals created by oxidation, ultraviolet light or mechanical action. As a result, the polymer chain may be severed by chain scission, reducing the molecular weight and those properties which are sensitive to molecular weight. Alternatively, the unsaturation sites may be subjected to grafting and crosslinking reactions which raise the molecular weight and undesirably stiffen the polymer making it unprocessable or ineffective as an adhesive. Hydrogenating the conventional unsaturated base polymers creates a nonpolar polymer which, although more stable, is difficult to tackify with resin additives and which is therefore inferior to unhydrogenated polymers in some applications, including pressure sensitive adhesives. It has always been the conventional wisdom that hydrogenated diblocks would suffer from the same problems and would not be acceptable in such adhesives.

The present invention offers a solution to some of these problems while still providing adequate adhesive properties, including lower viscosity than the base polymer alone, higher resistance to creep, better tack, and/or improved compatibility with certain substrates. It does so by providing an additional component which assists in tackifying the hydrogenated base polymer.

SUMMARY OF THE INVENTION

The present invention provides improved adhesive and sealant compositions which contain a base polymer which is a hydrogenated triblock, linear multiblock, radial, or star block copolymer of a vinyl aromatic hydrocarbon and a conjugated diene, from 3 to 50%, preferably 5 to 35%, most preferably 8 to 20%, by weight of a hydrogenated diblock copolymer of a vinyl aromatic hydrocarbon and a conjugated diene, and from 20 to 400 parts per 100 parts of copolymer of a tackifying resin. These compositions may also contain resins which extend the diene phase, resins which reinforce and/or extend the vinyl aromatic phase, polyolefins, fillers, wax, stabilizers and reactive components designed to crosslink the polymers and/or resins.

DETAILED DESCRIPTION OF THE INVENTION

The primary novel component of the adhesive and sealant compositions of the present invention is the above-described hydrogenated diblock copolymer which has both a vinyl aromatic hydrocarbon block and a saturated diene block. The conventional hydrogenated base polymer provides the primary load bearing capability of the adhesive and sealant compositions. It is important that this polymer be hydrogenated so that the structural integrity of the polymer is preserved even if outside forces that cause degradation are encountered. The diblock polymer should be hydrogenated for the same reason. However, because the diblock copolymer has a free diene block, it provides the composition with sufficient tack properties and/or the ability to be tackified to make effective compositions, such as pressure sensitive adhesive compositions. This is the case even though the diene is saturated because it is low in molecular weight, free-flowing, and able to wet substrate surfaces.

Preferably, the vinyl aromatic hydrocarbon is styrene. Other useful vinyl aromatic hydrocarbons include alphamethyl styrene, various alkyl-substituted styrenes, alkoxy-substituted styrenes, vinyl naphthalene, vinyl toluene and the like. The preferred dienes are butadiene and isoprene. Other dienes may also be used, including piperylene, methylpentadiene, phenylbutadiene, 3,4-dimethyl-1,3-hexadiene, 4,5-diethyl-1,3-octadiene and the like, preferably those conjugated dienes containing 4 to 8 carbon atoms.

The polymers used herein may be hydrogenated as generally described in the prior art, preferably so as to reduce at least about 90 percent of any olefinic double bonds in the polymer chains. Suitably at least 50 percent, preferably at least 70 percent, and more preferably at least 90 percent, most preferably at least 95 percent of the original olefinic unsaturation is hydrogenated.

The dienes used in this invention preferably should be those which are largely amorphous at use temperatures (usually 10° C. to 40° C.) and do not contain excess crystallinity which would interfere with flexibility. For butadiene, e.g., the percent of 1,2 addition should preferably be 30 percent to 65 percent to prevent excessive crystallinity after hydrogenation to ethylene-butylene (EB) rubber. Below 30 percent crystallinity is too high, giving a stiff polymer which is unsuitable for pressure sensitive adhesives. Above 65 percent the Tg (glass transition temperature) of the polymer is too high, making it difficult to formulate an acceptable pressure sensitive adhesive.

In general, the method suitable for the preparation of these block polymers is to make them by anionic polymerization from so-called "living" polymers containing a single terminal metal ion. "Living" polymers are polymers containing at least one active group such as a metal atom bonded directly to a carbon atom. "Living" polymers are readily prepared via anionic polymerization.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful in the present invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

In general, the living polymer blocks which form the polymers may be made sequentially or by making multiblock living polymers which are contacted with a coupling agent to couple the living multiblocks into triblock, multiblock, radial, or star copolymers. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the polymers of this invention will contain a single terminal reactive group, the polymers used in preparation of the polymers will be retained in solution after preparation without deactivating the reactive (living) site. In general, the coupling agents may be added to a solution of the polymer or a solution of the polymer may be added to the coupling agent.

The coupling process per se is described in detail in U.S. Pat. No. 4,096,203 which is herein incorporated by reference. Specific multifunctional coupling agents useful herein are described in that patent but there are other coupling agents which may also be useful herein. Star polymers are made by coupling polymer arms using a polyfunctional coupling agent or coupling monomer. A preferred coupling agent is a polyalkenyl aromatic coupling agent such as those described in U.S. Pat. Nos. 4,010,226, 4,391,949 and 4,444,953, which are herein incorporated by reference. U.S. Pat. No. 5,104,921, which is also herein incorporated by reference, contains a complete description of such polyalkenyl aromatic compounds at columns 12 and 13.

The hydrogenation of these copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the copolymer is dissolved in an inert hydrocarbon diluent such as cyclohexane and hydrogenated by reaction with hydrogen in the present of a soluble hydrogenation catalysts. Such processes are disclosed in U.S. Pat. Nos. 3,113,986, 4,226,952 and U.S. Pat. Re. No. 27,145, the disclosures of which are herein incorporated by reference. The polymers are hydrogenated in such a manner as to produce hydrogenated polymers having a residual unsaturation content in the polydiene block of less than about 20 percent, and preferably as close to 0 percent as possible, of their original unsaturation content prior to hydrogenation. A titanium catalyst such as disclosed in U.S. Pat. No. 5,039,755, which is herein incorporated by reference, may also be used in the hydrogenation process.

The base polymer must have sufficient molecular weight and vinyl aromatic hydrocarbon (styrene) content to be useful for adhesives and sealants. Generally, the styrene content should be from 4 to 36 percent by weight. For triblock copolymers, the overall molecular weight can range from 35,000 to 200,000 with the styrene block molecular weights ranging from 4,000 to 32,000 and the hydrogenated diene block molecular weights ranging from 20,000 to 140,000. For multiblock linear polymers, the same ranges apply except the hydrogenated diene block molecular weights can be from 8,000 to 120,000. For radial and star polymers, the polystyrene content should be from 4 to 36 percent by weight, the overall molecular weight should be from 100,000 to 450,000, the styrene block molecular weight should be from 4,000 to 20,000 and the hydrogenated diene block molecular weight should be from 8,000 to 70,000.

The diblock copolymer will generally comprise from 3 to 50 percent by weight of the total polymeric composition and will preferably be from 5 to 35 percent, most preferably 8 to 20 percent, by weight because this range gives a good balance of flow properties and adhesive properties when formulated with resins, oils, and other additives. These diblock copolymers may be made as part of the synthesis of the base polymer or they may be prepared separately and blended into the final composition. The molecular parameters may differ considerably from those of the base polymer, depending on the properties and performance desired in the final product. For example, the molecular weight of the polystyrene blocks may vary from 4000 to 32,000, that of the hydrogenated diene blocks may vary from 3000 to 90,000, the total diblock molecular weight may vary from 8,000 to 100,000, and the polystyrene content of the diblock copolymer may vary from 30 to 70 percent by weight.

If the diblock comprises more than 50 percent of the total polymeric composition, then the cohesive strength of the resultant composition is inadequate for most adhesive applications. It is preferred that it be less than 35 percent to preserve the proportion of load-bearing polymer at >65 percent. Below the minimum polystyrene block molecular weight, the diblock does not contribute to the shear strength of the adhesive. Above the maximum polystyrene block molecular weight, the diblock is too hard to form a pressure sensitive adhesive. If the overall styrene content is less than 30 percent, then the peel strength of the resultant adhesive is poor, and if it is more than 70 percent, then the diblock is difficult to process in a manufacturing plant. For example, if the molecular parameters are 2000 to 15,000 styrene/ethylene-butylene, then the composition will be poor in peel strength and low in holding power. On the other hand, if the molecular parameters are 35,000 to 10,000 styrene/ethylene-butylene, then the composition will be difficult to manufacture and the adhesive that is formed therefrom will be stiff and nontacky.

Molecular weights are conveniently measured by Gel Permeation Chromatography (GPC), where the GPC system has been appropriately calibrated. Polymers of known molecular weight are used to calibrate and these must be of the same molecular structure and chemical composition as the unknown block polymers that are measured. Anionically polymerized linear block polymers are close to monodisperse and it is both convenient and adequately descriptive to report the "peak" molecular weight of the narrow molecular weight distribution observed. The "peak" molecular weight is very nearly the same as the weight average molecular weight of the block polymer. For block polymers that are more polydisperse, a weight average molecular weight should be measured by light scattering or calculated from GPC data. Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modem Size-Exclusion Liquid Chromatography,* W. W. Yau, J. J. Kirkland, D. D. Bly, John Wiley & Sons, New York, N.Y., 1979.
2. *Light Scattering from Polymer Solution,* M. B. Huglin, ed., Academic Press, New York, N.Y., 1972.
3. W. Kaye and A. J. Havlik, *Applied Optics,* 12, 541 (1973).
4. M. L. McConnell, *American Laboratory,* 63, May, 1978.

The saturated copolymers of the present invention may be functionalized, such as with polar groups which increase adhesion to many types of surfaces, especially high energy surfaces. For example, they may be maleated or silanated.

The materials of the present invention are useful in adhesives (including pressure sensitive adhesives, contact adhesives, laminating adhesives and assembly adhesives, labels, packaging adhesives, weatherable tapes), sealants, printing plates, oil gels, wax additives, and maskants. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention and, e.g., a curing agent. However, in most adhesive and sealant applications, suitable formulations would also contain various combinations of resins, plasticizers, fillers, stabilizers and other ingredients such as asphalt. The following are some typical examples of formulations for adhesives and sealants.

In adhesives and sealant applications, it is common practice to add an adhesion promoting or tackifying resin that is compatible with the polymer, generally from 20 to 400 parts per hundred parts of polymer by weight. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperylene, 10% isoprene, 5% cyclo-pentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. Softening points of solid resins may be from about 40° C. to about 120° C. Liquid resins, i.e., softening points less than room temperature, may be used as well as combinations of solid and liquid resins. The amount of adhesion promoting resin employed varies from 0 to 400 parts by weight per hundred parts rubber (phr), preferably between 20 to 350 phr, most preferably 20 to 150 phr. The selection of the particular tackifying agent is, in large part, dependent upon the specific polymer employed in the respective adhesive composition.

A composition of the instant invention may contain plasticizers, such as rubber extending plasticizers, or compounding oils or organic or inorganic pigments and dyes. Rubber compounding oils are well-known in the art and include both high saturates content oils and naphthenic oils. Preferred plasticizers are highly saturated oils, e.g. Tufflo® 6056 and 6204 oil made by Arco and naphthenic process oils, e.g. Shellflex® 371 oil made by Shell. The amounts of rubber compounding oil employed in the invention composition can vary from 0 to about 150 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in sealant and adhesive formulations. This is especially true for exterior sealants in which fillers are added not only to create the desired appeal but also to improve the performance of the sealant such as its weatherability. A wide variety of fillers can be used. Suitable fillers include calcium carbonate, clays, talcs, silica, zinc oxide, titanium dioxide and the like. The amount of filler usually is in the range of 0 to about 65 %w based on the solvent free portion of the formulation depending on the type of filler used and the application for which the sealant is intended. An especially preferred filler is titanium dioxide.

Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidant combinations include 3-(3,5-di-t-butyl-4-hydroxyphenyl)propionate)methane (Irganox® 1010 from Ciba-Geigy) with tris(nonylphenyl)-phosphite (Polygard® HR from Uniroyal), Irganox® 1010 with bis(2,4-di-t-butyl-)pentaerythritol diphosphite (Ultranox® 626 from Borg-Warner).

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

All adhesive and sealant compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive, coating or sealant application.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, hydrogenated polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the polymers of this invention to prepare adhesives and sealants having properties suitable for many different applications.

The adhesive and sealant compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

The adhesive compositions of the present invention may be utilized as many different kinds of adhesives, for example, laminating adhesives, pressure sensitive adhesives, tie layers, hot melt adhesives, solvent borne adhesives and waterborne adhesives in which the water has been removed before curing. The adhesive is a formulated composition containing a significant portion of the polymer along with other known adhesive composition components. A preferred method of application will be hot melt application at a temperature around or above 100 ° C. because hot melt application above 100 ° C. minimizes the presence of water and other low molecular weight inhibitors of cationic polymerization.

Sealant compositions of this invention can be used for many applications. Particularly preferred is their use as gap fillers for constructions which will be baked (for example, in a paint baking oven) after the sealant is applied. This would include their use in automobile manufacture and in appliance manufacture. Another preferred application is their use in gasketing materials, for example, in lids for food and beverage containers. The unhydrogenated precursors may also be used in these applications.

In the following examples, the base polymer was a hydrogenated triblock copolymer containing styrene endblocks having a molecular weight of 5500 to 6600 and a hydrogenated isoprene (EP) midblock having a molecular weight of 50,000 to 69,000. The polystyrene content was 16 to 19 percent by weight. The diblock copolymer used in all of the examples was a hydrogenated diblock consisting of a 5700 molecular weight styrene block and a 5300 molecular weight EP block.

EXAMPLE 1

Two of these formulations were made, one with the triblock copolymer described above, formulation A, and the other with a 70 percent/30 percent by weight blend of the triblock copolymer and the diblock copolymer described above, formulation B. Each formulation incorporated 100 pans by weight total of the polymers, 111 pans by weight (pbw) of REGALREZ 1078 resin, hydrogenated styrene/alphamethylstyrene copolymer, 120 pans of REGALREZ 1018 resin, hydrogenated styrene/alphamethylstyrene copolymer (these are the tackifying resins), one pbw of Irganox 1010 antioxidant, and 0.25 pbw each of Tinuvin 327 and 770, ultraviolet protective agents. Various adhesive properties of these formulations were measured and are set forth in Table 1 below.

The SAFT (shear adhesion failure temperature) was measured by 1"×1" Mylar to Mylar lap joint with a 1 kg weight. SAFT measures the temperature at which the lap shear assembly fails under load. Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in.×½ in.) of tape from a standard test surface (steel, Kraft paper) under a standard load (2 kg), in shear at 2° antipeel (Pressure Sensitive Tape Council Method No. 7). Long times indicate high adhesive strength. 180° peel was determined by Pressure Sensitive Tape Council Method No. 1. Large numbers indicate high strength when peeling a test tape from a steel substrate. Polyken probe tack (PPT) was determined by ASTM D-2979. Loop tack (LT) was determined using TLMI loop tack tester. High numbers for PPT and LT indicate aggressive tack.

TABLE 1

| Adhesive Properties | Formulation A | Formulation B |
|---|---|---|
| Rolling Ball Tack, cm | 2.1 | 4.9 |
| Polyken Probe Tack, kg | 0.79 | 0.96 |
| Loop Tack, oz/in | 79 | 89.5 |
| 180 Degree Peel, pli | 3.6 | 6.2 |
| Holding Power/Steel, min | 230.3 | 200.8 |
| Holding Power/Kraft, min | 10.4 | 15.2 |
| SAFT/Mylar, °C. | 61.2 | 56 |
| SAFT/Kraft, °C. | 36.2 | 40.2 |
| Thickness, mils | 1.5 | 1.5 |
| Melt Viscosity, cps at 350° F. | 8380 | 2953 |

It can be seen that formulation B made according to the present invention has a much lower melt viscosity than formulation A, has better polyken probe tack, loop tack, peel strength, and SAFT (shear adhesion failure temperature) to Kraft than formulation A.

EXAMPLE 2

In this example, the compositions of the formulations are identical to those of Example 1 except that the triblock copolymer had a higher overall molecular weight (71,000 vs. 62,000). Formulation C contains no diblock. The adhesive properties of the three formulations are set forth in Table 2 below.

TABLE 2

| Adhesive Properties | Formulation C | Formulation D | Formulation E |
|---|---|---|---|
| Rolling Ball Tack, cm | 2.1 | 3 | 2.7 |
| Polyken Probe Tack, kg | 0.93 | 0.9 | 0.94 |
| Loop Tack, oz/in | 75 | 93.5 | 89.5 |
| 180 Degree Peel, pli | 3.6 | 6.6 | 5 |
| Holding Power/Steel, min | 105.2 | 172.8 | 238.6 |
| Holding Power/Kraft, min | 5.2 | 10 | 40.4 |
| SAFT/Mylar, °C. | 61.8 | 56.2 | 60.5 |
| SAFT/Kraft, °C. | 34.5 | 38.5 | 41.2 |
| Thickness, mils | 1.4 | 1.3 | 1.7 |
| Melt Viscosity, cps at 350° F. | 9963 | 3660 | 6125 |

It can be seen that formulations D (30% diblock) and E (15% diblock) made according to the present invention, have comparable rolling ball tack to formulation C, approximately the same polyken probe tack, considerably lower melt viscosity, better loop tack, better peel strength, and higher holding power to both steel and Kraft. The SAFTs to Mylar are slightly lower but the SAFTs to Kraft are slightly higher.

EXAMPLE 3

The adhesive formulations used in this example are the same as before except that the triblock copolymer had an overall molecular weight of 81,000. Formulation F contained no diblock. Formulation G contained 15 percent diblock, and formulation H contained 30 percent diblock. The adhesive properties are set forth below in Table 3.

TABLE 3

| Adhesive Properties | Formulation F | Formulation G | Formulation H |
|---|---|---|---|
| Rolling Ball Tack, cm | 2.3 | 3.4 | 4.4 |
| Polyken Probe Tack, kg | 1.01 | 1.47 | 1.14 |
| Loop Tack, oz/in | 77 | 65.5 | 94 |
| 180 Degree Peel, pli | 4.1 | 5.3 | 6.3 |
| Holding Power/Steel, min | 79.8 | 90.6 | 129.8 |
| Holding Power/Kraft, min | 3.2 | 10.5 | 14.7 |
| SAFT/Mylar, °C. | 70.3 | 67.8 | 64 |
| SAFT/Kraft, °C. | 35.8 | 37 | 38.2 |
| Thickness, mils | 1.5 | 1.7 | 1.5 |
| Melt Viscosity, cps at 350° F. | 16020 | 10850 | 5790 |

The polyken probe tack, peel strength, holding power to both steel and Kraft, and SAFT to Kraft of formulations G and H made according to the present invention are higher than those of formulation F. In addition, the loop tack of formulation H is higher. The SAFTs to Mylar are slightly lower. The melt viscosities of formulations G and H are considerably lower than the melt viscosity of formulation F.

EXAMPLE 4

Again, the formulations are the same but the triblock copolymer was the same one used in Example 2. Formulation J contained no diblock and formulation K contained 15 percent of the diblock. The adhesive properties are shown in Table 4 below.

TABLE 4

| Adhesive Properties | Formulation J | Formulation K |
|---|---|---|
| Rolling Ball Tack, cm | 1.8 | 3.5 |
| Polyken Probe Tack, kg | 2.02 | 1.66 |
| Loop Tack, oz/in | 64 | 84 |
| 180 Degree Peel, pli | 4.7 | 5.5 |
| Holding Power/Steel, min | 78.4 | 86.6 |
| Holding Power/Kraft, min | 41.4 | 16.8 |
| SAFT/Mylar, °C. | 60.2 | 60.2 |
| SAFT/Kraft, °C. | 39.8 | <38 |
| Thickness, mils | 4.6 | 2.6 |
| Melt Viscosity, cps at 350° F. | 11420 | 6610 |

The loop tack, peel strength, and holding power to steel of formulation K, made according to the present invention, are higher than that of formulation J. In addition, the melt viscosity of formulation K is lower than that of formulation J. The polyken probe tack, and holding power to Kraft are lower.

I claim:

1. An adhesive composition having improved resistance to degradation which comprises:

(a) a hydrogenated triblock, multiblock, radial, or star block copolymer of a vinyl aromatic hydrocarbon and a conjugated diene, (b) from 3 to 50 percent by weight of the total composition of a hydrogenated diblock copolymer of a vinyl aromatic hydrocarbon and a conjugated diene wherein the overall molecular weight of the diblock ranges from 8000 to 100,000, the molecular weight of the poly vinyl aromatic hydrocarbon block ranges from 4000 to 32,000, the molecular weight of the poly conjugated diene block ranges from 3000 to 90,000, and the vinyl aromatic hydrocarbon content ranges from 30 to 70 percent by weight of the riblock copolymer, and (c) 20 to 400 parts by weight per 100 parts by weight of total block copolymers of a tackifying resin.

2. The adhesive composition of claim 1 wherein the diblock comprises from 8 to 20 percent by weight of the total block copolymer composition.

3. An sealant composition having improved resistance to degradation which comprises:

(a) a hydrogenated triblock, multiblock, radial, or star block copolymer of a vinyl aromatic hydrocarbon and a conjugated diene, (b) from 3 to 50 percent by weight of the total composition of a hydrogenated diblock copolymer of a vinyl aromatic hydrocarbon and a conjugated diene wherein the overall molecular weight of the diblock ranges from 8000 to 100,000, the molecular weight of the poly vinyl aromatic hydrocarbon block ranges from 4000 to 32,000, the molecular weight of the poly conjugated diene block ranges from 3000 to 90,000, and the vinyl aromatic hydrocarbon content ranges from 30 to 70 percent by weight of the diblock copolymer, and (c) 20 to 400 parts by weight per 100 parts by weight of total block copolymers of a tackifying resin.

4. The sealant composition of claim 3 wherein the diblock comprises from 8 to 20 percent by weight of the total block copolymer composition.

* * * * *